(12) United States Patent
Poulin et al.

(10) Patent No.: US 6,443,015 B1
(45) Date of Patent: Sep. 3, 2002

(54) BAFFLE FOR A CAPACITIVE PRESSURE SENSOR

(75) Inventors: James Poulin, Derry, NH (US); Luke D. Hinkle, Townsend; Chris P. Grudzien, Lowell, both of MA (US)

(73) Assignee: MKS Instruments, Inc., Andover, MA (US)

( * ) Notice: Subject to any disclaimer, the term of this patent is extended or adjusted under 35 U.S.C. 154(b) by 0 days.

(21) Appl. No.: 09/394,804

(22) Filed: Sep. 10, 1999

(51) Int. Cl.[7] .............................. G01L 9/12; G01L 7/108
(52) U.S. Cl. ............................................. 73/724; 73/715
(58) Field of Search .......................... 73/715, 716, 718, 73/717, 724, 756, 723; 361/283.4, 708, 707, 706

(56) References Cited

U.S. PATENT DOCUMENTS

| | | | | |
|---|---|---|---|---|
| 3,675,072 A | * | 7/1972 | Hahn et al. ............... | 315/111 |
| 4,020,674 A | * | 5/1977 | Fechter et al. ............ | 73/40.5 |
| 5,271,277 A | * | 12/1993 | Pandorf ..................... | 73/724 |
| 5,808,206 A | * | 9/1998 | Pandorf et al. ............ | 73/756 |
| 5,811,685 A | * | 9/1998 | Grudzien, Jr. ............. | 73/724 |
| 5,948,169 A | | 9/1999 | Wu ........................... | 118/723 |

* cited by examiner

Primary Examiner—Harshad Patel
(74) Attorney, Agent, or Firm—Hale and Dorr LLP

(57) ABSTRACT

A baffle is positioned near a diaphragm of a capacitive pressure sensor to have a small volume therebetween. The baffle creates a high aspect ratio path to create molecular flow for molecules to travel before reaching the diaphragm. The path encourages contaminants to stick to the baffle or housing before reaching the diaphragm. The sensor further includes a particle trap between an inlet and the baffle.

7 Claims, 2 Drawing Sheets

BAFFLE FOR A CAPACITIVE PRESSURE SENSOR

BACKGROUND OF THE INVENTION

This invention relates to a capacitive pressure sensor that senses changes in capacitance between a diaphragm and an electrode.

Capacitive pressure sensors are used in a number of applications, including climate control systems and semiconductor processing. A pressure sensor has a housing, an input in the housing for receiving a fluid (gas or liquid) whose pressure is being sensed, a conductive flexible diaphragm and an electrode next to the diaphragm. The diaphragm and electrode have a capacitance between them. The sensor senses changes in the capacitance as the diaphragm moves relative to the electrode in response to pressure from the fluid.

It can be desirable to have a baffle between the inlet for the fluid whose pressure is being sensed, and the flexible diaphragm. The baffle helps prevent contaminants from contaminating the diaphragm. U.S. Pat. No. 5,811,685, which is hereby incorporated by reference for all purposes, describes a baffle and also some previous baffle designs. The patent further discusses reasons for and benefits of a baffle in such a sensor.

SUMMARY OF THE INVENTION

A capacitive pressure sensor of the present invention has a housing with an inlet for receiving a fluid, a diaphragm that flexes in response to pressure in the fluid, and a baffle designed to provide a high aspect ratio radial path for the gas molecules to flow between the inlet and the diaphragm. Preferably, the invention also includes a particle trap system (which is also a baffle), positioned such that the baffle is between the trap system and the diaphragm. The aspect ratio (the ratio of the radial length to the gap) of a path formed by the baffle is greater than 10, and preferably greater than 50.

In another aspect, the capacitive pressure sensor has a housing with an inlet for receiving a fluid, a diaphragm that flexes in response to pressure in the fluid, and a baffle between the inlet and the diaphragm, with the baffle designed so that a path taken by molecules from the inlet to the diaphragm creates molecular flow, as opposed to laminar flow.

The baffle is preferably positioned close to the diaphragm so that there is a small volume between them, so that the sensor responds quickly to changes in gas pressure.

The higher aspect ratio path formed by the baffle increases the likelihood that molecules will stick to a surface of the baffle or the housing before reaching the flexing portion of the diaphragm, thereby protecting the diaphragm from deposition. The small volume between the baffle and diaphragm does not reduce response time, as a large volume would. Other features and advantages will become apparent from the following detailed description, drawings, and claims.

DETAILED DESCRIPTION

Figure 1:
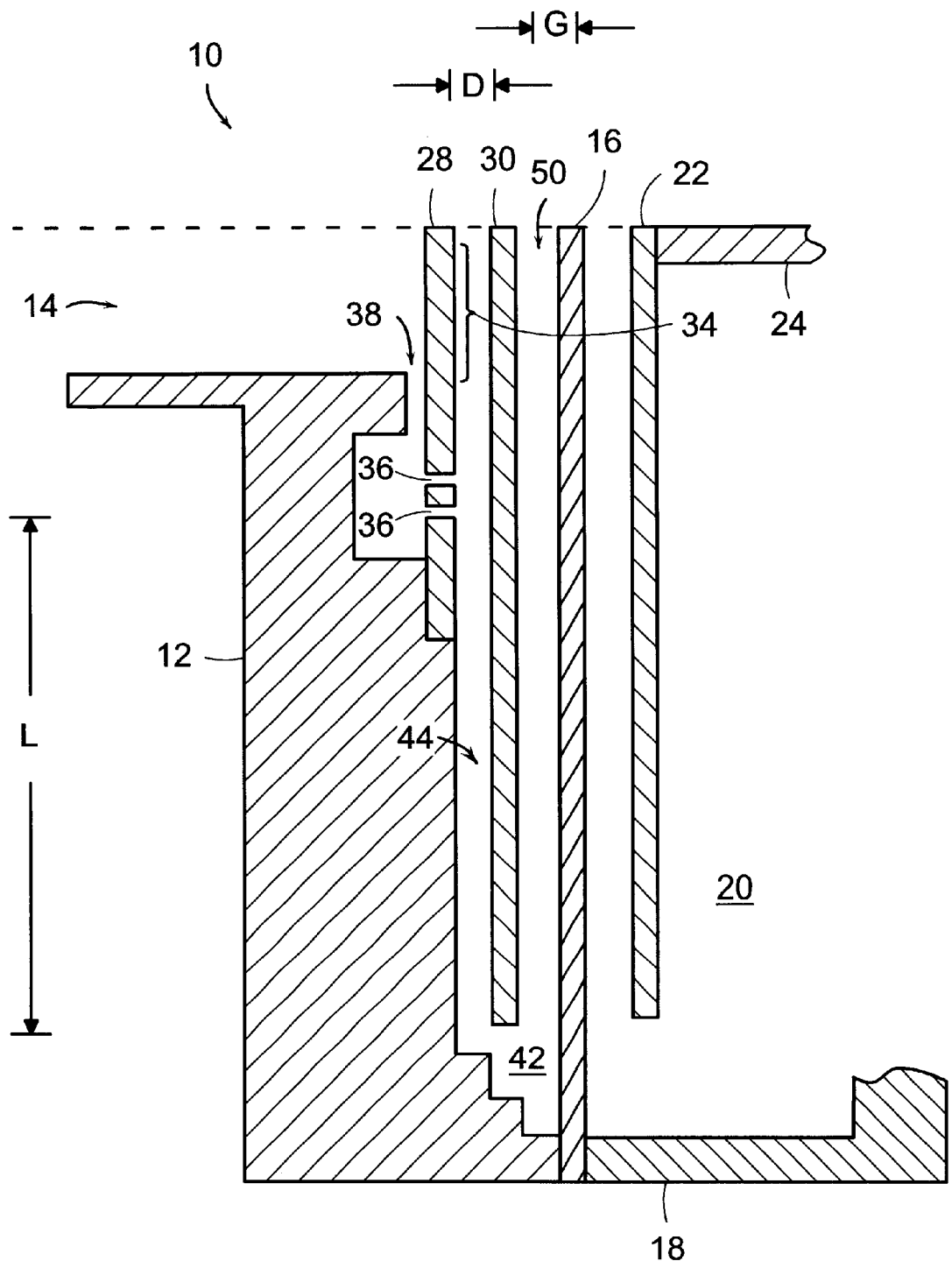
FIG. 1 is a cross-sectional view of one half of a sensor according to the present invention.

FIG. 1 shows a cross-sectional view of a symmetrical half of a portion of a sensor 10. Sensor 10 has a housing member 12 with an inlet 14 for receiving a fluid to be sensed. A diaphragm 16 is welded between housing member 12 and another housing member 18. A chamber 20 is enclosed by diaphragm 16 and housing member 18 and has a desired pressure, e.g., zero pressure. Next to diaphragm 16 is an electrode 22 supported by a post 24. While shown here as a single conductive piece, the electrode may be one or more conductive films formed on a dielectric (ceramic) disk. The diaphragm and electrode have a capacitance between them. Diaphragm 16 flexes in response to a change in pressure in the fluid at inlet 14, thus changing the capacitance between the diaphragm and the electrode.

Figure 2:
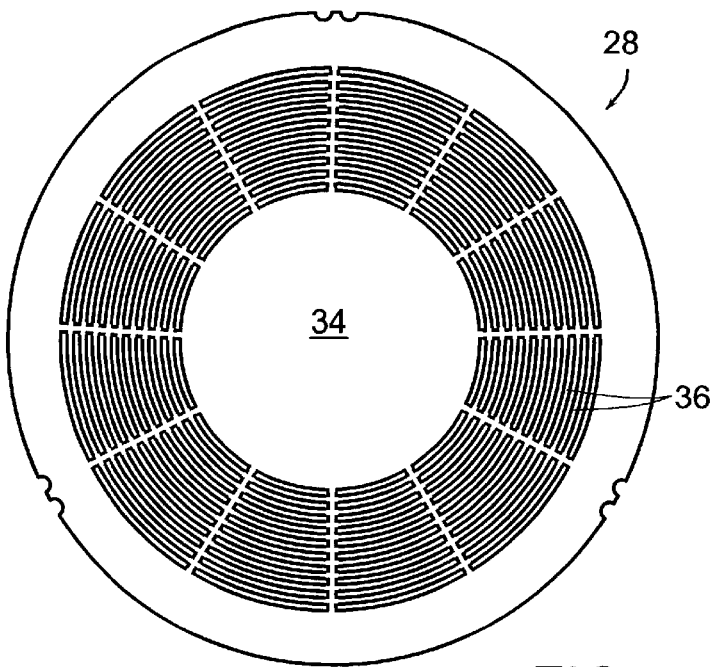
FIG. 2 is a plan view of the particle trap.

In the path between the inlet and the diaphragm is a trap system 28, and between trap system 28 and diaphragm 16 is a baffle 30. The design of trap system 28 is described in more detail in the incorporated patent. Referring also to FIG. 2 herein, trap system 28 has a central portion 34 with a diameter greater than that of inlet 14 to block a direct path from the inlet to the diaphragm. Around central portion 34 are a number of peripheral openings 36. These openings are formed as a series of sectors evenly spaced about the trap system in a circumferential direction, and also arranged at different diameters radially.

Referring to FIG. 1, particles from inlet 14 pass through an annular region 38 between housing member 12 and trap system 28, and then through openings 36 (unless the particles are too small to fit through the annular region or the openings). Annular region 38 and openings 36 are sized to prevent relatively large particles (e.g., 250 microns and larger) from passing through.

Figure 3:
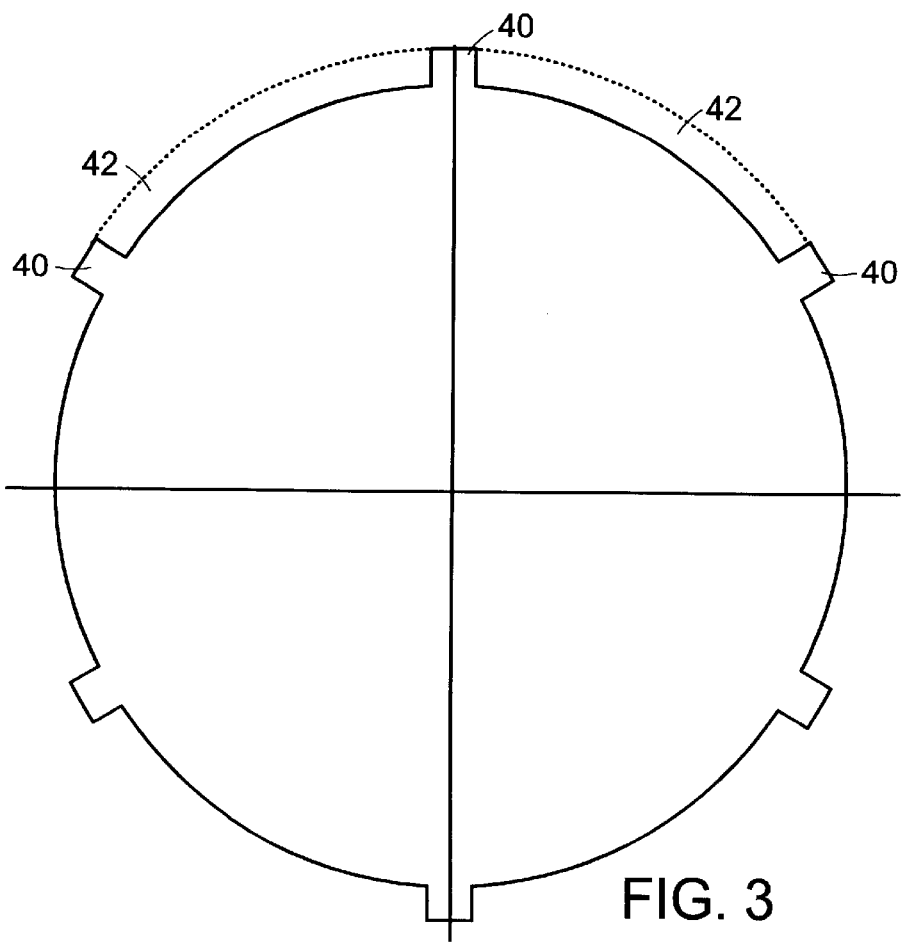
FIG. 3 is a plan view of the baffle according to the present invention.

Referring also to FIG. 3, baffle 30 is essentially a circular metal plate with a plurality of evenly spaced tabs 40 about the circumference. These tabs essentially define a number of annular sectors 42 with a width in the radial direction between baffle 30 and housing member 12 being the same as the length of the tabs. The design of the baffle and its positioning relative to the housing thus define openings as annular sectors through which the fluid can pass.

Baffle 30 is positioned next to housing member 12 to define a radial path 44 for the gas including any contaminant species component to flow between openings 36 and annular sectors 42, and then to diaphragm 16. The aspect ratio of this radial path is defined as the ratio of a radial length l of the path from openings 36 to annular sectors 42, to the gap d representing the gap between baffle 30 and housing member 12. The aspect ratio according to the present invention is greater than 10, and is preferably greater than 50. The length is preferably at least 1 cm, and preferably in the range of about 1–4 cm; the gap is preferably no more than about 0.1 cm, and preferably in a range of about 0.025–0.1 cm.

A contaminant molecule traveling in such a high aspect ratio path will likely collide with surfaces of baffle 30 and housing member 12 hundreds of times while traversing this path. The probability for such a molecule to be deposited on a surface of baffle 30 or housing member 12 is a function of the number of these collisions and a sticking coefficient. With an increasing number of collisions, the likelihood of the molecule being deposited goes up dramatically. If the number of collisions is greater than 100, even a low sticking coefficient will result in a high probability of deposition on the baffle and the housing surfaces, thereby protecting the diaphragm from the depositing species. The path thus is designed so that there is a significant likelihood of deposition of contaminants.

The path creates a molecular flow at normal vacuum processing conditions, i.e., less than 100 mT. Such molecular flow causes multiple collisions with the surfaces for molecules traversing the gap, as opposed to laminar flow in which a boundary layer of flow is around and isolates a center stream. Molecular flow, as opposed to laminar flow, is flow in which the mean free path of a molecule is much greater than the dimension of the path (here, the gap); i.e., a molecule hits the walls of the path more often than it hits other molecules.

If there is a large volume between the baffle and the diaphragm, the response time for the diaphragm decreases because of the resultant pneumatic time constant, defined as V/C, where V is the volume behind a pathway with conductance C. With the present invention, however, the volume between the baffle and the diaphragm is small, so that the response is fast even though the small gap imposes a lower conductance due to a restriction on flow. The gap g between baffle 30 and diaphragm 16 is preferably in the range of about 0.025–0.1 cm, and the internal volume 50 between baffle 30 and diaphragm 16 is preferably less than 0.1 cubic inches (1.6 cm$^3$), and more than 0.05 cubic inches (0.8 cm$^3$).

Trap system 28 is preferably made of a corrosion-resistant, non-contaminating material, such as stainless steal or an alloy such as Inconel. Baffle 30 is also preferably made of metal.

The baffle of the present invention thus provides an advantageously long path for allowing molecular collisions and sticking before reaching the diaphragm, while simultaneously providing an advantageously small volume between the baffle and the diaphragm.

Having described embodiments of the present invention, it should be apparent that modifications can be made without departing from the scope of the invention as defined by the appended claims. For example, the baffle system could be used with a differential capacitor sensor.

What is claimed is:

1. A capacitive pressure sensor comprising:

a housing having an inlet for receiving a fluid, the inlet being characterized by a first diameter;

a flexible diaphragm mounted within the housing, the diaphragm flexing in response to pressure from the fluid the diaphragm lying substantially in a plane when the pressure from the fluid equals a particular value;

a first baffle member disposed within the housing between the inlet and the diaphragm, the first baffle member being substantially parallel to the plane, the first baffle member having a closed central portion and peripheral openings for allowing particles smaller than the openings to pass through, the closed central portion being characterized by a second diameter that is greater than the first diameter;

a second baffle member disposed parallel to the plane within the housing between the diaphragm and the first baffle member, the second baffle member being characterized by a third diameter greater than the second diameter, a periphery of the second baffle member being spaced from the housing to allow fluid to pass in a direction perpendicular to the plane.

2. The pressure sensor of claim 1, wherein a radial path between the openings of the first baffle member and the periphery has an aspect ratio greater than 10.

3. The pressure sensor of claim 2, wherein the aspect ratio is greater than 50.

4. The pressure sensor of claim 1, wherein the housing has an annular opening for allowing particles to travel from the inlet to the openings in the first baffle member.

5. The pressure sensor of claim 1, wherein the volume between the second baffle member and diaphragm is less than 1.6 cm$^3$.

6. The pressure sensor of claim 5, wherein a radial path between the openings of the first baffle member and the periphery has an aspect ratio greater than 10.

7. The pressure sensor of claim 6, wherein the aspect ratio is greater than 50.

* * * * *